Figure 1:
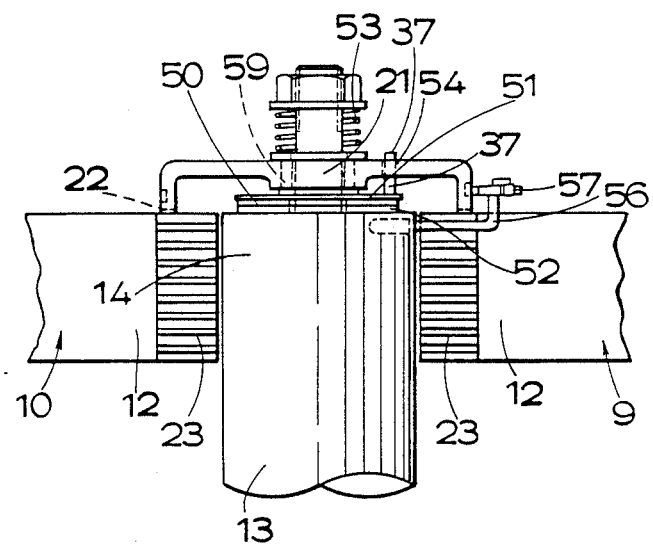

United States Patent [19]

Urban

[11] Patent Number: 4,838,390

[45] Date of Patent: Jun. 13, 1989

[54] AUTOMATIC ADJUSTER FOR A VEHICLE SHOE-DRUM BRAKE

[75] Inventor: John A. Urban, Plainwell, Mich.

[73] Assignee: Lucas Industries Public Limited Company, Birmingham, United Kingdom

[21] Appl. No.: 149,635

[22] Filed: Jan. 28, 1988

[30] Foreign Application Priority Data

Feb. 3, 1987 [GB] United Kingdom ............... 8702341

[51] Int. Cl.⁴ .............................................. F16D 65/56
[52] U.S. Cl. ............................ 188/79.55; 188/196 BA; 192/111 A
[58] Field of Search ............... 188/79.51, 79.62, 79.63, 188/79.64, 196 BA, 196 D, 79.55; 192/111 A

[56] References Cited

U.S. PATENT DOCUMENTS

| | | | |
|---|---|---|---|
| 2,109,284 | 2/1938 | Brinck et al. | 188/196 BA |
| 2,109,637 | 3/1938 | Gutkaiss | 188/196 BA |
| 2,733,781 | 2/1956 | Brisson | 188/79.62 X |
| 3,334,713 | 8/1967 | Russell | 188/196 BA |
| 3,891,068 | 6/1975 | Camph | 188/196 BA |

Primary Examiner—George E. A. Halvosa
Attorney, Agent, or Firm—Harness, Dickey & Pierce

[57] ABSTRACT

An automatic adjuster comprises a transmission member, suitably a crown wheel, and thrust assemblies, of which the effective lengths are adjustable to adjust the spacing between a pair of shoe-ends, and the crown wheel is coupled to a brake-applying cam through a lost-motion connection, and a clutch. In a brake-applying mode the transmission mechanism is operative to increase the effective lengths of the thrust assemblies after the lost-motion has been taken up and until a critical point is reached at which the clutch slips in one direction. An inhibit mechanism is incorporated for limiting movement of the crown wheel in the opposite brake release mode until any previous excess movement of the crown wheel in the brake-applying mode has been accommodated by slippage of the clutch in the opposite direction.

8 Claims, 2 Drawing Sheets

AUTOMATIC ADJUSTER FOR A VEHICLE SHOE-DRUM BRAKE

This invention relates to an automatic adjuster for a vehicle shoe-drum brake of the kind comprising a pair of brake shoes mounted on a torque plate and carrying friction linings for engagement with a rotatable drum, an actuating cam carried by, or integral with, a cam shaft is journalled in the torque plate for rotation about a fixed axis to enable the cam to separate adjacent shoe ends, the adjuster being of the type comprising a pair of thrust assemblies, each adapted to act between the cam and a respective shoe-end and each comprising first and second, interengaged, screw-threaded members which are relatively rotatable to increase the effective length of the thrust assembly to compensate for wear of the lining of the respective shoe, and transmission means co-operating with corresponding members of the two thrust assemblies so that both said corresponding members are adapted to rotate together, whereby the effective lengths of both assemblies can be increased by equivalent amounts.

Automatic adjusters of the type described above will hereinafter be referred to as "automatic adjusters of the type described".

In known vehicle shoe-drum brakes automatic adjusters operate automatically to maintain braking clearances within desired limits. It is a problem, however, to ensure that such adjusters do not overadjust, for example as a result of heavy braking which may cause the drum to deflect.

A further problem may arise if the drum is subject to thermal expansion due to an increase in temperature generated during a long brake application, such as may be experienced during a downhill descent. This may have the effect of causing the adjuster to adjust in order to reduce the braking clearances or the shoe-centre clearance when the drum diameter has increase followed by a decrease in shoe-centre clearance as the drum cools down. This may result in dragging the drum onto the friction linings of the shoes, or binding of the brake, which, in consequence, leads to premature wear of the linings and otherwise inefficient brake operation.

According to our invention, in an automatic adjuster of the type decribed for a vehicle shoe-drum brake, the tranmission means is coupled to the cam through a drive mechanism including a lost-motion connection which determines the braking clearances, and a clutch, and the transmission means is operative in a brake-applying mode to increase the effective lengths of the two thrust assemblies after th lost-motion has been taken up and until a critical point is reached at which the clutch slips in one direction, inhibit means being incorporated for limiting movement of the transmission means in the opposite brake release mode until any previous excess movement of the transmission means in the brake-applying mode has been accomodated by slippage of the clutch in the opposite direction.

We therefore provide a bi-directional adjuster for a shoe-drum brake which is insensitive to loads in excess of a critical point, such as may be experienced as a result of heavy braking, and will not adjust beyond this critical point, but at the same time can also compensate for excessive adjustment which may have occurred as a result of thermal expansion of the drum by permitting a degree of adjustment in the opposite direction, effectively to increase the shoe-centre clearance, and thereby prevent binding of the linings against the drum as the drum cools.

The critical point is defined as the point at which the force of the frictional engagement between the screw-threaded members of the thrust assemblies due to the brake-applying load applied by the cam exceeds the force transmitted to them through the transmission means. Thus the clutch slips in the said one direction before the brake-applying load attains a value sufficient to achieve heavy braking. This value may not necessarily be attained as a consequence of drum deflection due to thermal expansion, but any consequent excess movement is accomodated by operation of the inhibit means.

Conveniently a peg is driven from the cam through the clutch, and a drive face comprises an abutment at one end of an arcuate slot in the transmission means of which the circumferential length determines the braking clearances, engagement of the peg with the abutment causing the effective lengths of both thrust assemblies to be increased until at the critical point at which the resistance to further increase in the lengths of both thrust assemblies exceeds the brake-applying load, the clutch slips in the said one direction to preclude further increase in the lengths of the thrust assemblies.

Upon release of the brake with the inhibit means operative, when the peg has engaged with the opposite end of the slot, the clutch slips in the said opposite direction until a predetermined distance from the end of the release stroke whereupon the inhibit means releases the transmission means and the clutch re-engages to drive the transmission means in the opposite direction, whereby to reduce the effective lengths of the thrust assemblies.

Preferably the transmission means comprises a crown wheel which is journalled for rotation about an axis co-axial with that of the cam, and the inhibit means comprises a pawl which is adapted to co-operate with angularly spaced ratchet teeth in the peripheral edge of the crown wheel to prevent movement of the crown wheel with the cam in a part of the brake-release mode, the cam being provided with a cam profile with which a follower associated with the pawl is adapted to co-operate to cause intermittent engagement of the pawl with the ratchet teeth.

Figure 2:
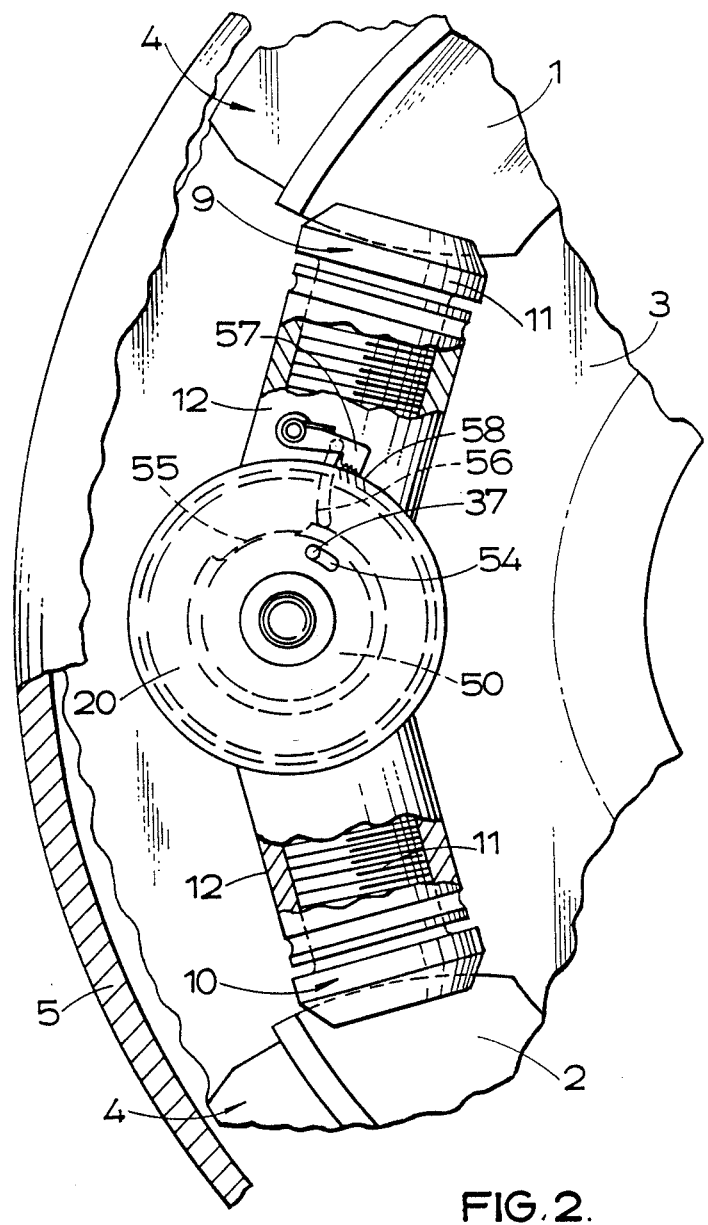

One embodiment of our invention is illustrated in the accompanying drawings in which:

FIG. 1 is a side elevation of a combined actuator and adjuster assembly for a pair of shoe-ends of an internal shoe-drum brake; and FIG. 2 is a plan of the assembly of FIG. 1 and showing the installation of the adjuster assembly in an internal shoe-drum brake.

As illustrated in the drawings, a combined actuator and adjuster assembly is located between the adjacent ends of a pair of shoes 1, 2 of an internal shoe drum brake. The other ends of the shoes abut against a fixed abutment (not shown), suitably in the form of a rigid block. The shoes 1, 2 are mounted on a torque plate 3 and carry friction linings 4 for engagement with a rotatable drum 5.

The actuator assembly comprises a pair of thrust assemblies 9 and 10. Each thrust assembly 9, 10 comprises inner and outer co-operating screw-threaded components 11, 12 of which the inner component 11 acts on the respective shoe end by which it is held against relative rotation. The outer components 12 are rotatable relative to the inner components to alter the effective lengths of the thrust assemblies 9, 10.

A cam shaft 13 spaced from and parallel to the axis of the brake is journalled for rotation in a housing on the torque plate. A cam 14 mounted on the upper end of the cam shaft 13 acts directly on the two thrust assemblies 9, 10 so that angular movement of the cam 14 acts to separate the thrust members 9 and 10 and, in turn, the adjacent shoe ends to apply the brake.

Transmission means comprising a crown wheel 20 journalled for rotation on a spigot 21 projecting axially from the cam 14 has a toothed annular rim 22 meshing with external teeth 23 on the peripheral outer surfaces of the two outer components 12. Thus rotation of the crown wheel 20 will affect simultaneous rotation of the two outer components, in turn to adjust the effective lengths of the two thrust assemblies 9, 10.

As illustrated the drive mechanism comprises a clutch 50 which surrounds the spigot 21 comprises upper and lower clutch plates 51 and 52. A compression spring 53 acts through a stepped bush 59 to urge the plates 51 and 52 into engagement with each other. A drive peg 37 is upstanding from the upper clutch plate 51 and projects into a circumferentially extending slot 54 arcuate outline in the crown wheel 20. The cam 14 is itself provided with a local cam profile 55 constituted by a recess which extends angularly for a minor circumferential distance, and a follower 56 which is normally engageable with the outer face of the cam 14 to hold a pivotally mounted pawl 57, defining inhibit means, out of engagement with ratchet teeth 58 on the peripheral edge of the crown wheel 20. In this position the drive peg 37 is positioned at one end of the slot 54, and the effective length of the slot, namely the distance between the peg 37 and the opposite end of the slot 54, determines the braking or shoe-centre clearances.

When the brake is to be applied, rotation of the cam 14 separates the thrust assemblies 9 and 10 to urge the brake shoes 1, 2 into engagement with the drum 5. The drive peg 37 is carried round with the cam 14 and moves towards the opposite end of the slot 54. After a relatively small angular movement of the cam 14, the follower 56 moves into the cam recess 55, permitting the pawl 57 to engage with the ratchet teeth 58.

When no adjustment to compensate for wear of the friction linings 4 is required, no movement will be imparted to the crown wheel 20 by the peg 37.

If adjustment to compensate for wear of the friction linings 4 is required, the angular movement of the peg 37 with the cam 14 exceeds the effective length of the slot 54, and the peg 37 then engages with the crown wheel 20 to carry it round with the crown wheel 20 clicking over one or more teeth on the pawl 57. Simultaneously the crown wheel 20 rotates the outer components 12 of the thrust assemblies 9, 10 to increase the effective lengths of the thrust assemblies 9, 10, and thereby maintain the shoe-centre clearance as required. When the linings 4 touch the drum 5 and the brake-applying force attains a critical point, further roatation of the crown wheel 20 is prevented by the clutch 50 slipping. This is because at the critical point the load due to the friction between the screw-threads of the two components 11, 12 of each thrust assembly 9, 10 is greater than the load which can be applied to the crown wheel 20 through the clutch 50.

When the brake is released and the cam 14 rotates in the opposite direction under the influence of shoe-return springs, the peg 37 moves back through the slot 54 until it engages with the opposite end of the slot 54. Since the pawl 57 is still engaged with the crown wheel 20, the crown wheel is held against rotation, and the clutch 50 slips in the opposite direction. Since no movement can be imparted to the thrust assemblies 9 and 10, no adjustment can take place. Shortly before the cam 14 has returned to its rest position, the follower 56 is lifted out of the cam recess 55 to disengage the pawl 57 from the crown wheel 20. The crown wheel 20 is now free to rotate and the remaining movement of the cam 14 to the rest position rotates the outer components 12 by an amount substantially less than the brake clearances determined by the effective length of the slot 54. This establishes the desired shoe-centre clearances between the linings 4 and the drum 5.

Although the critical point occurs when the friction between the screw-threads of the two components 11, 12 of each thrust assembly 9, 10 exceeds the brake-applying force, this will occur at different braking conditions depending upon the nature of the particular brake application. For example, the critical point may be reached rapidly as a result of heavy or substantial braking, whereas the critical point may take longer to reach as a result of thermal expansion of the drum 5 occurring as a result of a lower brake-applying force being applied for a considerable period of time.

Thus any tendency for the assembly to "over-adjust", for example as a result of drum deflection resulting from heavy or substantial braking, or as a result of thermal expansion of the drum, is compensated for on reverse brake release as required by operation of the adjuster in the opposite direction as described above.

Since the adjuster is arranged to operate in both direction of cam rotation, it is unlikely that it will seize through lack of use.

In the adjuster described above the teeth on the outer members of the thrust assemblies 9 and 10 with which the crown wheel 20 meshes are straight. This is essential in order to ensure that there will be no tendency for the engagement between the crown wheel 20 and the thrust assemblies 9 and 10 to fight or otherwise oppose or resist rotation of the crown wheel 20 which might otherwise occur should the interengaging teeth be of helical outline.

I claim:

1. An automatic adjuster for a vehicle shoe-drum brake of the type comprising a torque plate, a pair of brake shoes mounted on said torque plate and carrying friction linings for engagement with a rotatable drum, a cam shaft journalled in said torque plate for rotation about a fixed axis, and a cam located between adjacent ends of said shoes and rotatable with said cam shaft to generate a brake-applying load arranged to separate said adjacent ends in order to apply said shoes to said drum, wherein said adjuster comprises a pair of thrust assemblies, each said thrust assembly being adapted to act between said cam and a respective one of said adjacent ends, and each said thrust assembly comprising first and second, intrengaged, screw threaded members which are relatively rotatable to increase the effective length of said thrust assembly to compensate for wear of said lining of said respective shoe, transmission means co-operating with corresponding said members of said two thrust assemblies so that both said corresponding members are adapted to rotate together, whereby said effective lengths of both said thrust assemblies can be increased by equivalent amounts, a drive mechanism through which said transmission means is coupled to said cam, said drive mechanism including means defining a lost-motion connection which determines said braking clearances, and a two-way clutch, said transmission means being movable in first and second opposite directions in a brake-applying mode and a brake-release mode, inhibit means being incorporated for inhibiting movement of said transmission means in said brake-release mode, and release means for releasing said inhibit means to permit limited movement of said transmission means in said second direction in said brake-release mode, said two-way clutch comprising two clutch parts which are engageable during said brake-applying mode to take up the lost-motion in said lost-motion connection and thereafter to drive said transmission means in said first direction to increase said effective lengths of said two thrust assemblies until a critical point is reached at which said two clutch parts slip relative to each other in one direction, and said inhibit means being operative during said brake-release mode to restrain movement of said transmission means in said second direction causing said two clutch parts to slip relative to each other in the opposite direction after said lost-motion has been taken up and until said cam reaches a predetermined distance from the end of its release stroke when said release means is operable to release said inhibit means to allow limited movement of said transmission means in said opposite direction to decrease said effective lengths of said thrust assemblies for the remainder of said brake-release mode.

2. An automatic adjuster as claimed in claim 1, wherein said transmission means includes means defining an arcuate slot of which opposite ends define first and second abutments and of which the circumferential length determines said braking clearances, and a peg is driven from said cam through said clutch, said peg being adapted to engage with a drive face defined by said first abutment to cause the effective lengths of both said thrust assemblies to be increased up to a critical point defined by the point at which the resistance to further increase in the lengths of both said thrust assemblies exceeds said brake-applying load and said two clutch parts slip relative to each other in the said one direction to preclude further increase in said lengths of the thrust assemblies.

3. An automatic adjuster as claimed in claim 2, wherein said transmission means comprises a crown wheel having a peripheral edge provided with angularly spaced ratchet teeth, and mounting means are provided to define an axis co-axial with that of said cam and upon which said crown wheel is journalled for rotation, said inhibit means comprising a pawl adapted to co-operate with said angularly spaced ratchet teeth in said peripheral edge of said crown wheel to prevent movement of said crown wheel with said cam in a part of said brake-release mode, said cam being provided with a cam profile, and insert said release means comprises a follower associated with the pawl and adapted to co-operate with said profile to cause intermittent engagement of said pawl with the ratchet teeth.

4. An automatic adjuster as claimed in claim 3, wherein said cam profile comprises a recess in said peripheral edge of said crown wheel, said recess extending angularly for a minor circumferential distance.

5. A vehicle shoe-drum brake comprising a rotatable drum, torque plate, a pair of brake shoes mounted on said torque plate and carrying friction linings for engagement with said rotatable drum, a cam shaft journalled in said torque plate for rotation about a fixed axis, a cam located between adjacent ends of said shoes and rotatable with said cam shaft to generate a brake-applying load arranged to separate said adjacent ends in order to apply said shoes to said drum, a pair of thrust assemblies, each said thrust assembly acting between said cam and a respective one of said adjacent ends, and each said thrust assembly comprising first and second, interengaged, screw threaded members which are relatively rotatable to increase the effective length of said thrust assembly to compensate for wear of said lining of said respective shoe, transmission means co-operating with corresponding said members of said two thrust assemblies so that bothe said corresponding members are adapted to rotate together, whereby said effective lengths of both said thrust assemblies can be increased by equivalent amounts, a drive mechanism through which said transmission means is coupled to said cam, said drive mechanism including means defining a lost-motion connection which determines said braking clearances, and a two-way clutch, said transmission means being movable in first and second opposite directions in a brake-applying mode and a brake-release mode, inhibit means being incorporated for inhibiting movement of said transmission means in said brake-release mode, and release means for releasing said inhibit means to permit limited movement of said transmission means in said second direction in said brake-release mode, said two-way clutch comprising two clutch parts which are engageable during said brake-applying mode to take up the lost-motion in said lost-motion connection and thereafter to drive said transmission means in said first direction to increase said effective lengths of said two thrust assemblies until a critical point is reached at which said two clutch parts slip relative to each other in one direction, and said inhibit means being operative during said brake-release mode to restrain movement of said transmission means in said second direction causing said two clutch parts to slip relative to each other in the opposite direction after said lost-motion has been taken up and until said cam reaches a predetermined distance from the end of its release stroke when said release means is operable to release said inhibit means to allow limited movement of said transmission means in said opposite direction to decrease said effective lengths of said thrust assemblies for the remainder of said brake-release mode.

6. A brake as claimed in claim 5, wherein said transmission means includes means defining an arcuate slot of which opposite ends define first and second abutments and of which the circumferential length determines said braking clearances, and a peg is driven from said cam through said clutch, said peg being adapted to engage with a drive face defined by said first abutment to cause the effective lengths of both said thrust assemblies to be increased up to a critical point defined by the point at which the resistance to further increase in the lengths of both said thrust assemblies exceeds said brake-applying load and said two clutch parts slip relative to each other in the said one direction to preclude further increase in said lengths of the thrust assemblies.

7. A brake as claimed in claim 6, wherein said transmission means comprises a crown wheel having a peripheral edge provided with angularly spaced ratchet teeth, and mounting means are provided to define an axis co-axial with that of said cam and upon which said crown wheel is journalled for rotation, said inhibit means comprising a pawl adapted to co-operate with said angularly spaced ratchet teeth in said peripheral edge of said crown wheel to prevent movement of said crown wheel with said cam in a part of said brake-release mode, said cam being provided with a cam profile, and said release means comprises a follower associated with the pawl and adapted to co-operate with said profile to cause intermittent engagement of said pawl with hte ratchet teeth.

8. A brake as claimed in claim 7, wherein said cam profile comprises a recess in said peripheral edge of said crown wheel, said recess extending angularly for a minor circumferential distance.

* * * * *